No. 796,811. PATENTED AUG. 8, 1905.
W. H. & H. T. COLDWELL.
MOTOR LAWN MOWER AND SWEEPER.
APPLICATION FILED JUNE 2, 1904.
6 SHEETS—SHEET 1.
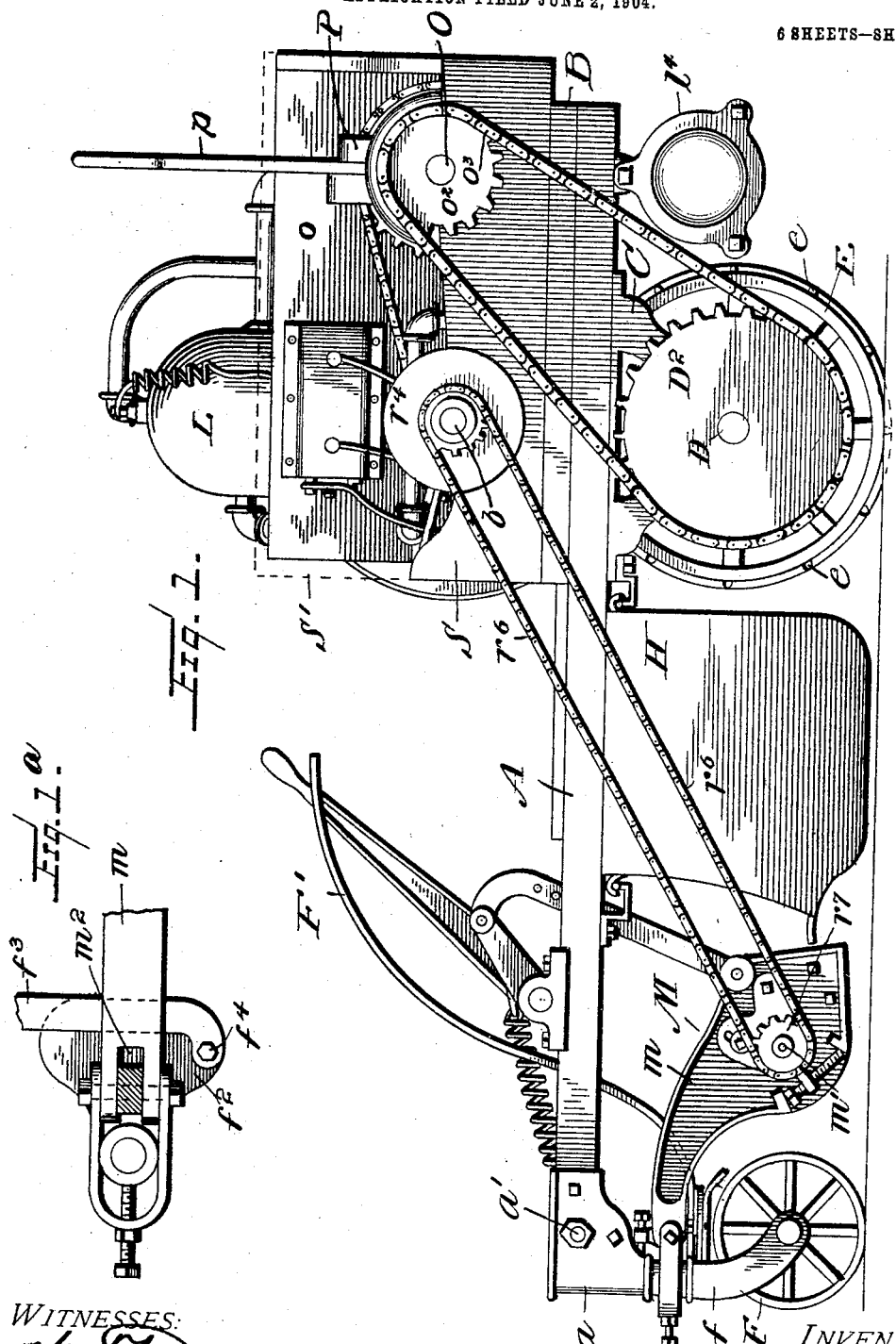
WITNESSES:
Wm. F. Doyle,
J. K. Moore.
INVENTORS
William H. Coldwell and
Harry T. Coldwell
BY
Whitaker & Prevost Attorneys No. 796,811. PATENTED AUG. 8, 1905.
W. H. & H. T. COLDWELL.
MOTOR LAWN MOWER AND SWEEPER.
APPLICATION FILED JUNE 2, 1904.
6 SHEETS—SHEET 2.
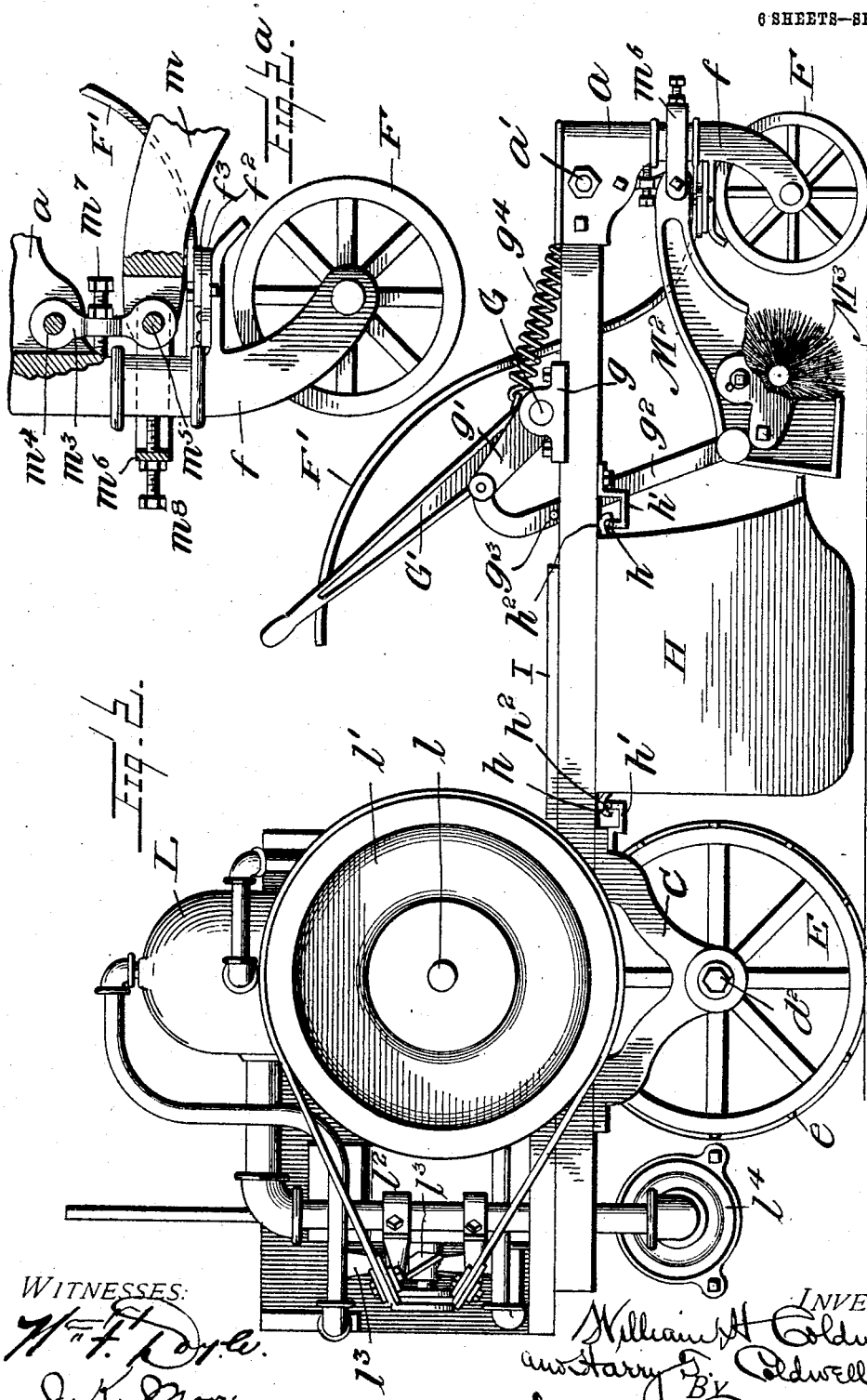
WITNESSES: INVENTORS.

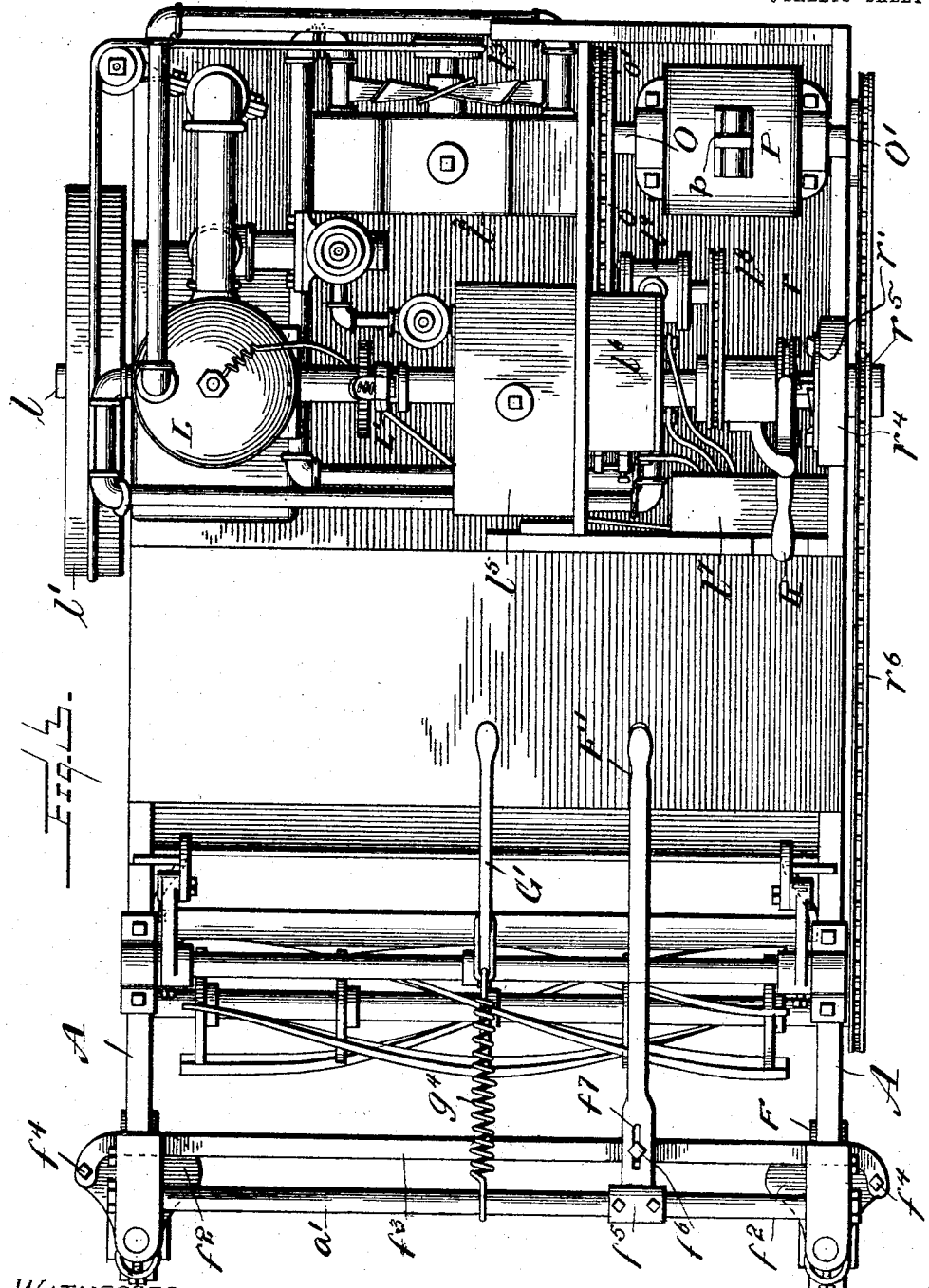

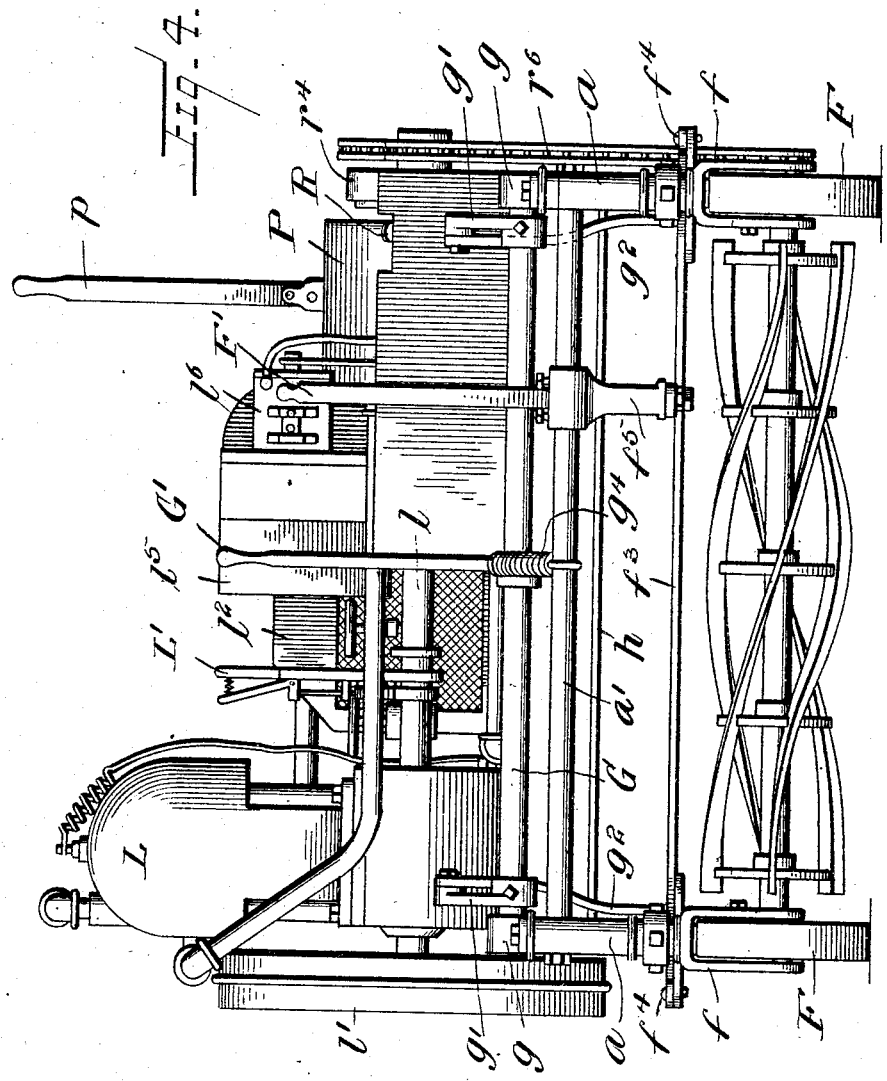

No. 796,811. PATENTED AUG. 8, 1905.
W. H. & H. T. COLDWELL.
MOTOR LAWN MOWER AND SWEEPER.
APPLICATION FILED JUNE 2, 1904.
6 SHEETS—SHEET 5.
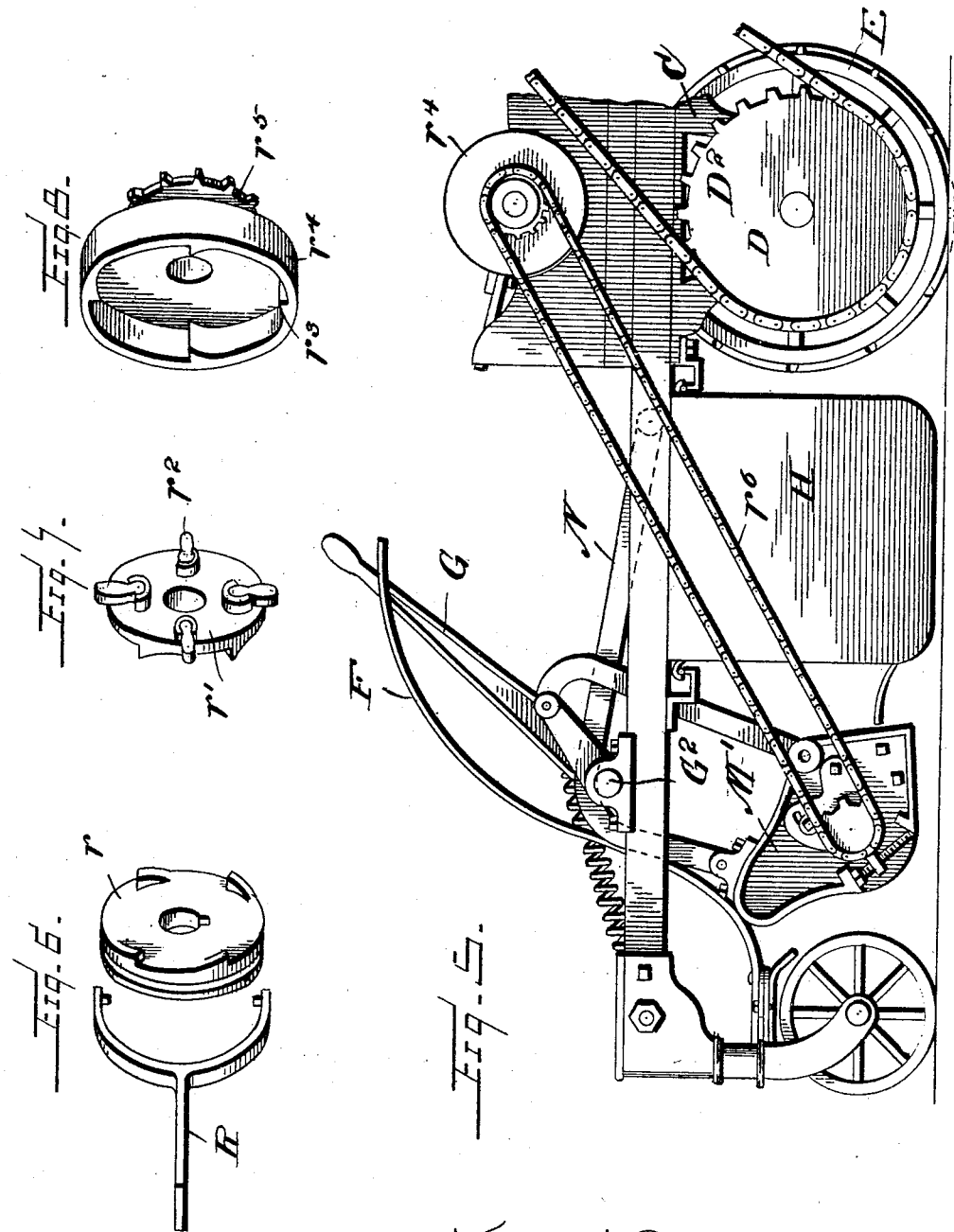

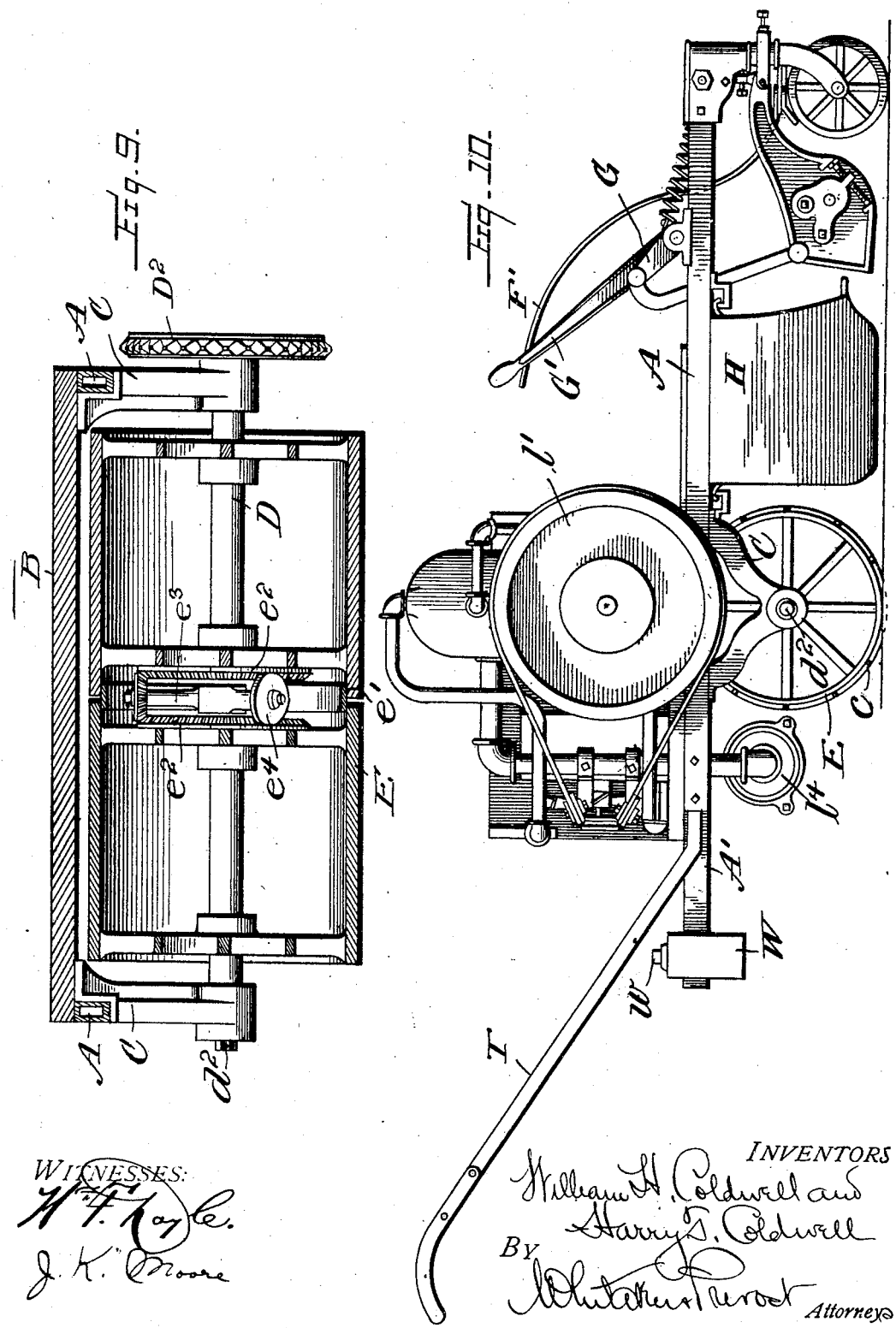

UNITED STATES PATENT OFFICE.

WILLIAM H. COLDWELL AND HARRY T. COLDWELL, OF NEWBURGH, NEW YORK.

MOTOR LAWN-MOWER AND SWEEPER.

No. 796,811.    Specification of Letters Patent.    Patented Aug. 8, 1905.

Application filed June 2, 1904. Serial No. 210,890.

*To all whom it may concern:*

Be it known that we, WILLIAM H. COLDWELL and HARRY T. COLDWELL, citizens of the United States, residing at Newburgh, in the county of Orange and State of New York, have invented certain new and useful Improvements in Motor Lawn-Mowers and Sweepers; and we do hereby declare the following to be a full, clear, and exact description of the invention, such as will enable others skilled in the art to which it appertains to make and use the same.

Our invention consists in the novel features hereinafter described, reference being had to the accompanying drawings, which illustrate one form in which we have contemplated embodying the invention, and said invention is fully disclosed in the following description and claims.

Referring to the said drawings, Figure 1 represents a left-side elevation of a motor lawn-mower embodying our invention. Fig. 1$^a$ is a detail view, partly in section, of a part of the mechanism for steering the front or caster wheels. Fig. 2 is a right-side elevation of the machine. Fig. 2$^a$ is a detail showing a portion of the frame and one of the caster-wheels and illustrating the devices for attaching the lawn-mower frame to the machine and the steering devices for the caster-wheels. Fig. 3 is a top plan view of the machine. Fig. 4 is a front elevation of the same. Fig. 5 is a partial left-side elevation of the machine, showing a different construction for attaching the mower-frame. Figs. 6, 7, and 8 are detail views of parts of the clutch, ratchet, and sprocket for driving the wiper or rotary cutter of the mowing-machine in one direction only. Fig. 9 is a transverse vertical section through the traction and lawn-rolling rollers, showing the manner of mounting and driving the same. Fig. 10 is a right-side elevation of the entire machine, showing it provided with guiding-handles and counterbalance-weights for relieving the pressure of the caster-wheels upon the grass.

The main frame of the machine comprises the longitudinal side bars A A, (formed, preferably, hollow and of rectangular shape in cross-section, as shown in Fig. 9,) connected in any desired manner and provided at the rear with a platform B. The main frame is provided adjacent to its rear end with downwardly-extending hangers C C, in which is mounted a shaft or axle D, and upon this shaft or axle are mounted the traction and lawn-rolling rollers E E.

The front ends of the side bars A A of the main frame are provided with bracket-castings $a$ $a$, connected by a tie-rod $a'$.

F F represent two caster-wheels mounted in the usual yokes $f$, the shanks or spindles of which are mounted in the brackets $a$ $a$, thus supporting the front end of the main frame. The yokes $f$ are provided each with a steering-arm $f^2$, extending rearwardly therefrom, these steering-arms being for convenience in the form of fan-shaped plates having portions extending laterally with respect to the vertical planes of the caster-wheels.

$f^3$ represents a connecting-bar connecting the two steering-arms $f^2$ $f^2$ and connected pivotally thereto at $f^4$ by bolts or other suitable means, the points $f^3$ being each on the outer side of the plane of the adjacent caster-wheel, (see Fig. 3,) whereby in steering the machine to the right or left the caster-wheel on the outer side of the curve will be given a greater inclination than the other.

F' represents a steering-lever pivotally connected at its forward end to a casting $f^5$ on the tie-rod $a'$ and having a pivotal connection with the connecting-bar by means of a stud or bolt $f^6$ passing through a slot $f^7$ in the steering-lever. The steering-lever F' is bent upward and rearward, so as to be in reach of an operator sitting upon the machine.

E E represent the traction and lawn-rolling rollers mounted loosely on the shaft or axle D with a compensating gear between them comprising gear-wheels $e^2$ $e^2$, secured to the hubs or arms of the rollers, and a spider $e^3$, mounted rigidly on the shaft D and carrying the pinions $e^4$ $e^4$ $e^4$, meshing with said gear-wheels.

M represents the mower-frame, comprising two side frames $m$, suitably connected and braced and provided with the usual stationary cutter and revolving cutter or wiper, the latter being carried by the wiper-shaft $m'$, mounted in suitable bearings. The mower-frame is detachably secured to the main or motor-carrying frame and is preferably carried thereby at all times. In Figs. 1 to 4 we have illustrated one construction for supporting the mower-frame. In these figures each side frame has a forwardly-extending part which is provided at its forward end with a vertical notch $m^2$. (See Fig. 1$^a$.)

$m^3$ represents a link, which has its upper end pivoted at $m^4$ to a bolt passing through the bracket $a$ of the main or motor frame (see Fig. 2$^a$) and its lower end pivoted by a bolt $m^5$ in the recess $m^2$ in the mower side frame. The bolt $m^5$ also passes through the ends of a yoke $m^6$ or U-shaped strap, which surrounds the lower part of bracket $a$, which forms the bearing for the caster-wheel spindle. A set-screw $m^7$ passes through the link $m^3$ and engages bracket $a$ to adjust the mower-frame rearwardly, and a set-screw $m^8$ passes through the bend of the strap $m^6$ and engages the bracket $a$ for adjusting the mower-frame forwardly. Each of said screws is provided with a set-nut, and this adjustment is provided for adjusting the tension of the sprocket-chain which drives the wiper-shaft $m'$, as will appear more fully hereinafter.

Upon the side bars A A of the main frame are bearings $g$ $g$, in which is mounted the transverse rock-shaft G, provided with lifting-arms $g'$ $g'$, which are connected by links $g^2$ $g^2$ to the mower-frame M. The links $g^2$ are each provided with an adjustable stop $g^3$ for limiting the downward movement of the mower-frame, and thus regulating the height of cut. We prefer to provide the links $g^2$ with a series of holes in different horizontal planes, in which the adjustable stops $g^3$ may be secured, so that a variation in the height of cut may be obtained.

The mower-frame is normally held in raised or inoperative position by a counterbalance spring or weight. In this instance we have shown a spring $g^4$ having its forward end secured to the tie-rod $f''$ and its rear end connected to a lever G', (which is in this instance a hand-lever,) secured to the rock-shaft G. This lever is so arranged that when it is pulled rearward to depress the mower-frame into operative or cutting position it will carry the point of engagement of the spring therewith into substantial alinement with the shaft G, and thus lock the lever in this position. The lever is thus self-locking. By raising the lever G' slightly the power of the spring is made effective and the mower will be instantly raised from the ground. This construction is very desirable, as it enables the operator by a slight touch of lever G' to instantly raise the mower-frame to pass over stones, &c., which might injure the cutters. As before intimated, the spring holds the mower-frame normally in raised position, and it may be thrown down into operative position by means of the hand-lever G'.

In Fig. 5 we have illustrated a slight modification of the construction for securing the mower-frame to the main or motor frame. In this instance we provide a pair of links or arms N N, pivoted at their rear ends to the side bars A A substantially in line with the driving-chain for the wiper-shaft, said arms being bent over rock-shaft, here designated G$^2$, and extending downward therefrom, their lower and forward ends being detachably connected to the mower-frame M' by suitable bolts. This construction allows the mower-frame to be raised and lowered without materially affecting the tension of the sprocket-chain. The other parts represented in this figure are identical with those shown in Figs. 1 to 4, except that the stops $g^3$, previously described, are dispensed with, as the arms N N will engage the rock-shaft and form a stop for the downward movement of the mower into cutting position.

In either of the forms shown in Figs. 1 to 5 it is obvious that by removing the bolts which connect the mower side frames to the supporting-links it can be quickly and easily removed. We desire to have the mower-frame removably supported, for the reason that it is frequently desirable to detach it and substitute therefor a lawn-sweeping device or other device for operating upon the lawn or ground. In Fig. 2, for example, we have shown the lawn-mower frame removed and a substantially identical frame M$^2$ substituted therefor, carrying a rotary brush M$^3$ instead of the wiper and stationary knife-bar. When so arranged, the machine may be used for sweeping a lawn, path, roadway, or other part of the ground.

The motor-carrying frame is also preferably provided with a grass-catching device H, which is removably supported in rear of the mower or sweeper frame. In this instance the main frame is provided with a pair of transverse bars $h$ $h$, supported by brackets $h'$ $h'$, slightly below the level of the side-frame bars A A. The grass-box is provided with hook-shaped lugs or projections $h^2$ to engage said rods, so that it may be drawn out laterally and emptied when necessary. Above the grass-box is a footboard I, which is secured to the side bars and forms a top for the grass-box when the latter is in operative position. It is obvious that the grass-box may be drawn out and left off of the machine, if desired.

Upon the platform B of the main or motor-carrying frame is mounted the motor for operating the traction and lawn-rolling rollers and also the revolving member (whether rotary cutter, brush, or other device) of the suspended frame. In this instance we have shown a gasolene explosion-motor L, of any usual or preferred form, provided with the crank-shaft $l$, balance-wheel $l'$, the cooling device $l^2$, provided with fan $l^3$, muffler $l^4$, gasolene-tank $l^5$, spark-coil $l^6$, and batteries $l^7$, all of usual or preferred construction. The particular form of the motor has no bearing upon our invention and the various parts thereof will therefore not be more particularly referred to herein.

The motor-shaft $l$ extends transversely across the main frame, being supported in suitable bearings, and is provided with a sprocket transmitting motion through chain $l^8$ to a pump $l^9$ for circulating the cooling-water through the cylinder, water-jacket, and cooling device in the usual manner. The motor-shaft is also provided with a driving-sprocket connected by a chain $o$ to a large sprocket-wheel $o'$ on the counter-shaft O O', which is arranged parallel to the motor-shaft and is provided with a starting and reversing gear P, which forms no part of my invention and will not be particularly described. The device P is provided with a control-lever $p$, which when in a central position permits the motor-shaft to rotate without operating the driving member O' of the counter-shaft. By moving lever $p$ in one direction the driving member O' is operated in one direction and by moving lever $p$ in the opposite direction the direction of rotation of the driving member O' is reversed. The driving member O' is provided with a sprocket-wheel $o^2$, connected by chain $o^3$ with a large sprocket-wheel $D^2$ on the shaft or axle of the traction-rollers, thus providing for driving them in either direction and for disconnecting the engine therefrom. It will also be seen that the speed of rotation is reduced from the motor-shaft to the counter-shaft and again from the counter-shaft to the axle D, thus allowing the motor to be operated at high speed without driving the traction-rollers beyond a desired speed.

The rotary wiper or brush of the suspended frame is operated from the motor-shaft independently of the traction-rollers, so that the said rotary part is not controlled by the lever $p$. In this instance the motor-shaft $l$ is provided with a sliding clutch member $r$, splined on the shaft and provided with an operating-lever R. The other clutch member is carried by a disk $r'$, (see Figs. 6, 7, and 8,) loose on the shaft, and provided with pawls $r^2$, adapted to engage interior ratchet-teeth on a drive-wheel $r^4$, to which is secured a sprocket-wheel $r^5$, which may be formed integrally with the wheel $r^4$, if desired. The wheel $r^4$ and sprocket $r^5$ are also loose on the shaft $l$. The sprocket $r^5$ is connected by a chain $r^6$ to a sprocket $r^7$ on the shaft $m'$ of the wiper or rotary cutter of the mower-frame, Fig. 1 and Fig. 5, or a similar sprocket on the shaft of the rotary brush $M^3$, Fig. 2, for driving the same. The object of the ratchet-and-pawl construction previously described is to prevent the rotary wiper from being reversely rotated at any time, which would injure the cutting edges thereof. By means of the lever R it will be seen that the rotary cutter (or brush) may be stopped or thrown into operation independently of the traction-rollers, and it is also to be noted that when the whole machine is in operation and it is desired to stop the traction-wheels the rotary device of the suspended frame may be permitted to turn, thus putting sufficient load upon the motor (when an explosion-motor is used) to prevent it from racing materially. Hence the motor may be continued in operation and the necessity of stopping it is avoided. This is important, as this type of motor usually requires to be started by hand, which would necessitate the operator getting off of the machine. Another advantage of this construction is that the operator is enabled to drive the rotary cutter by power from the motor while the machine is on a lawn and to adjust or set down the rotary cutter upon the stationary cutter until it works accurately and properly in relation therewith without sending the machine to the shop when such adjustment is necessary to compensate for wear.

The gearing previously described is incased in a box or casing S, having a removable part S', (shown in dotted lines in Fig. 1,) which serves as a seat for the operator when the machine is in use.

The speed of the motor may be accelerated or diminished by varying the timing of the sparking or igniting mechanism, as is usual with explosion-motors, said devices being controlled by a hand-lever L'.

The weight of the motor, gearing, and connected parts is so disposed with respect to the axle D of the traction-rollers that substantially the entire weight of the motor-frame is carried by the rollers and only sufficient weight is borne by the caster-wheels to keep them in contact with the ground. In other words, the weight of the motor, &c., is so disposed as to counterbalance a large portion of the weight of the front part of the motor-frame and the mower-frame, thus preventing the caster-wheels, which are rather narrow, from cutting into the lawn or pressing down the uncut grass, as one of said caster-wheels runs in the uncut grass when the machine is in operation. In some instances we further provide the motor-carrying or main frame with counterbalance-weights to more accurately accomplish this result.

In Fig. 10 we have shown the motor-frame side bars A provided with rearwardly-extending arms A' A', on which are placed weights W, which are preferably adjustable on said arms to assist in accurately counterbalancing such part of the weight of the front part of the main frame and the suspended frame as may be desired. These weights are provided with set-screws $w$ or other means to hold them rigidly in their adjusted positions. This construction is especially desirable when the machine is to be used with both a lawn-mower and lawn-sweeper, as it enables the machine to be adjusted according to the variations in the weight of these two devices. In Fig. 10 we have also shown the motor-carrying frame provided with rearwardly-extending steering-handles T for use in case the operator desires to walk behind the machine and guide it from that position.

It will be noted that the mower-frame is contained within the outlines of the motor-frame and does not extend beyond it at any point. We designate this arrangement, for convenience of reference, as a "self-contained machine," by which term we mean that all the working parts are within the limits of the main frame, and thereby distinguish it from machines in which the mower-frame is pushed ahead of or extends beyond the limits of the main or motor-casing frame.

What we claim, and desire to secure by Letters Patent, is—

1. The combination with the main or motor-carrying frame, traction devices supporting the rear end of said frame, and supporting-wheels connected to the front portion of said main frame, of a separate secondary frame having portions extending transversely of the main frame, arranged between the front and rear supporting devices of the main frame, and connected to the main frame, so as to cause the secondary frame to be propelled by and with the main frame, a rotary device mounted in the secondary frame independently of the main frame, immediately in rear of the front supporting-wheels of the main frame, whereby the position of the said rotary device with respect to the ground passed over is governed by the front wheels of the main frame, a motor carried by the main frame, and connections from the motor to said traction devices of the main frame, and to the said rotary device of the secondary frame, substantially as described.

2. In a motor lawn-mower, the combination with the main frame, combined traction and lawn-rolling rollers supporting the rear end of said frame and supporting-wheels connected to the front portion of said main frame, of a secondary frame supported by the main frame between its front and rear ground-engaging devices, cutting mechanism comprising stationary and movable cutters carried by said secondary frame immediately in rear of said front wheels of the main frame, whereby the position of the said cutting mechanism with respect to the ground passed over is governed by the front wheels of the main frame, a motor carried by the main frame and connections from the motor to the traction-roller and to the said movable cutter, substantially as described.

3. In a motor lawn-mower, the combination with the main frame, combined traction and lawn-rolling rollers supporting the rear end of said frame and supporting-wheels connected to the front portion of said main frame, of a secondary frame supported by the main frame between its front and rear ground-engaging devices, cutting mechanism comprising a stationary knife and a rotary cutter carried by said secondary frame immediately in rear of said front wheels of the main frame, whereby the position of the said cutting mechanism with respect to the ground passed over is governed by the front wheels of the main frame, and means for raising and lowering said secondary frame with respect to the main frame, a motor carried by the main frame and connections from said motor to said traction-rollers and to said rotary cutter, substantially as described.

4. In a motor lawn-mower, the combination with the main frame, combined traction and lawn-rolling rollers supporting the rear end of said frame and supporting-wheels connected to the front portion of said main frame, of a secondary frame supported by the main frame between its front and rear ground-engaging devices, cutting mechanism comprising a stationary knife and a rotary cutter carried by said secondary frame immediately in rear of said front wheels of the main frame, whereby the position of the said cutting mechanism with respect to the ground passed over is governed by the front wheels of the main frame, adjustable stops connected to the supporting devices for said secondary frame and adapted to engage portions of the main frame to regulate the distance between said cutting mechanism and the ground when in operative position, a motor carried by the main frame and connections from said motor to said traction-rollers and to said rotary cutter, substantially as described.

5. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, adjustable stops connected with the supporting devices for said secondary frame and adapted to engage portions of the main frame to regulate the distance between said rotary device and the ground when in operative position and mechanism connected with the supporting devices for said secondary frame for raising it out of operative position and holding it, a motor carried by the main frame and connections from said motor to the traction-rollers and to said rotary grass-engaging device, substantially as described.

6. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, said secondary frame being detachably and pivotally connected with the main frame, supporting devices for said secondary frame, detachably connected therewith in a different transverse vertical plane from said pivotal connection, means for raising and lowering said secondary frame connected with said supporting devices, whereby the secondary frame may be removed and a similar frame with a different form of grass-engaging device inserted, a motor carried by the main frame and connections between the motor and said traction-rollers and the said rotary grass-engaging device of the secondary frame, substantially as described.

7. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, a motor mounted upon the main frame above the axis of said traction-rollers, whereby substantially the entire weight of the motor is carried by said roller and driving connections between said motor and said traction-rollers and said rotary grass-engaging device, substantially as described.

8. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, a motor carried by said main frame, said main frame being counterbalanced upon the axis of said rollers so as to relieve the front supporting-wheels of the main frame of a portion of the weight of the main frame and of the suspended secondary frame, and driving connections from the motor to said traction-wheels and to said rotary grass-engaging device, substantially as described.

9. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, a motor carried by the main frame, connections from the motor to the traction-rollers and to the said rotary grass-engaging device and adjustable counterbalancing devices for said main frame for relieving the front supporting-wheels of a part of the weight of the main frame and the suspended secondary frame, substantially as described.

10. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of the said front wheels of the main frame, whereby the position of the said rotary device with respect to the ground passed over is governed by the front wheels of the main frame, a motor carried by said main frame above the axis of said traction-rollers, connections from the motor to the traction-rollers and to the rotary grass-engaging device and an adjustable counterbalance-weight secured to the main frame in rear of said rollers, substantially as described.

11. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, a motor carried by the main frame and connected with the traction-rollers and said rotary grass-engaging device, a counterbalancing device connected to said secondary frame for holding it raised out of operative position and means for depressing said secondary frame into operative position, substantially as described.

12. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, devices connected with the main frame and secondary frame for supporting the latter, a spring connected with said supporting devices and holding said secondary frame normally raised out of operative position, and means for depressing said secondary frame into and locking it in operative position including a depressing-lever connected with said supporting devices, a motor carried by the main frame and connected with said traction-rollers and with said grass-engaging device, substantially as described.

13. In a motor lawn-mower or sweeper, the combination with the main frame, of traction and lawn-rolling rollers connected therewith, supporting-wheels connected with said frame in advance of said rollers, a secondary frame movably connected to the main frame, and propelled thereby, a rotary grass-engaging device mounted in the said secondary frame, a motor carried by the main frame and connected with the traction-rollers and said rotary device, a rock-shaft secured to the main frame, arms on said rock-shaft, links connecting said arms to the secondary frame, a spring connected with said rock-shaft and normally holding the secondary frame raised out of operative position, and a depressing-lever connected to said rock-shaft, substantially as described.

14. In a motor lawn-mower or sweeper, the combination with the main frame, of traction and lawn-rolling rollers connected therewith, supporting-wheels connected with said frame in advance of said rollers, a secondary frame, movably connected to the main frame, and propelled thereby, a rotary grass-engaging device mounted in the said secondary frame, a motor carried by the main frame and connected with the traction-rollers and said rotary device, a rock-shaft secured to the main frame, lifting-arms secured thereto, links connecting said arms with said secondary frame, a lever-arm connected to said shaft, a spring connected to said lever-arm, and having its other end connected to a stationary part of the frame, and a hand-operated device for rocking said shaft, the connection of the spring with said lever-arm being such that when the shaft is operated by the hand-operated device the said point of connection is brought substantially into line with the rock-shaft and the stationary part to which the spring is connected, thereby locking the parts in such position, substantially as described.

15. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, said secondary frame being pivotally connected to the main frame forward of the rotary grass-engaging device, supporting devices engaging said secondary frame in rear of said grass-engaging device, a motor supported upon the rear portion of the main frame, connections between said motor and the said traction-rollers, a sprocket-chain connecting said motor and said rotary grass-engaging device and mechanism for adjusting said secondary frame longitudinally with respect to the main frame to regulate the tension of said sprocket-chain, substantially as described.

16. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, cutting mechanism comprising a stationary knife and a rotary cutter carried by said secondary frame immediately in rear of said front wheels of the main frame, whereby the position of the said cutting mechanism with respect to the ground passed over is governed by the front wheels of the main frame, a motor on the main frame provided with a driving-shaft, a counter-shaft, reducing-gearing between the motor-shaft and counter-shaft, and reversing mechanism connected with the counter-shaft, operatively connected with said traction-rollers, and connections from the motor-shaft to the rotary cutter, whereby the traction-rollers may be thrown out of operation without stopping the rotary cutter, substantially as described.

17. In a motor lawn-mower or sweeper, the combination with the main frame, combined traction and lawn-rolling rollers supporting the rear end of said frame and supporting-wheels connected to the front portion of said main frame, of a secondary frame supported by the main frame between its front and rear ground-engaging devices, a rotary grass-engaging device carried by said secondary frame immediately in rear of said front wheels of the main frame, whereby the position of the said rotary device with respect to the ground passed over is governed by the front wheels of the main frame, transversely-disposed supporting-bars secured to said main frame a grass-box provided with hook-shaped projections for engaging said bars, to support said grass-box in rear of said secondary frame, a motor carried by the main frame, and connections from the motor to the traction-rollers, and to the rotary grass-engaging device, substantially as described.

In testimony whereof we affix our signatures in the presence of two witnesses.

WILLIAM H. COLDWELL.
HARRY T. COLDWELL.

Witnesses:
  C. L. WANG,
  M. McBURNEY.